United States Patent Office 3,485,079
Patented Dec. 23, 1969

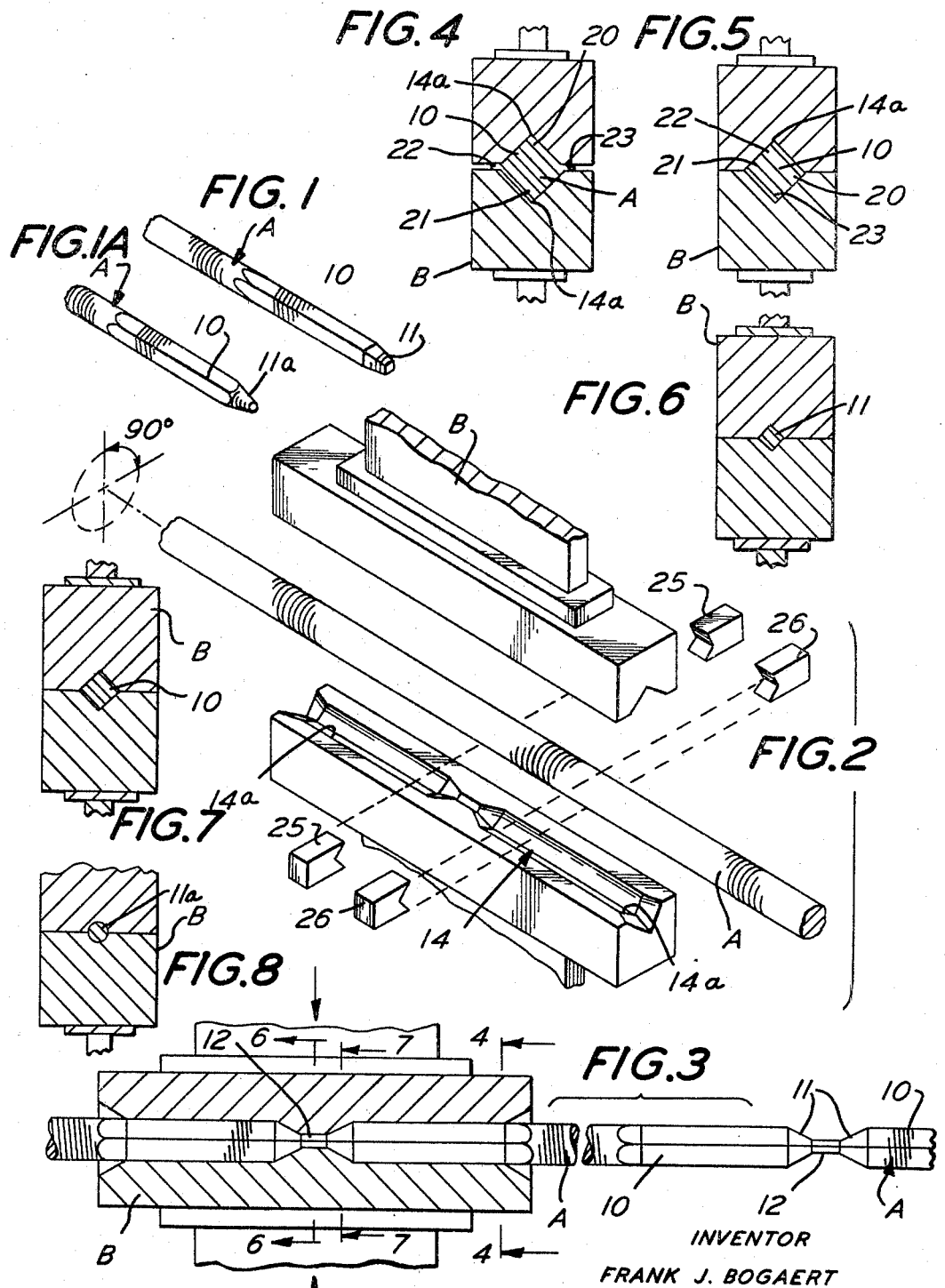

3,485,079
METHOD FOR FORMING PARALLEL SQUARE AND TAPER-ENDED FLEXIBLE SHAFTING
Frank John Bogaert, Staten Island, N.Y., assignor to Pennsalt Chemicals Corporation, Philadelphia, Pa., a corporation of Pennsylvania
Filed Jan. 26, 1968, Ser. No. 700,829
Int. Cl. B21j 5/00
U.S. Cl. 72—376                 10 Claims

ABSTRACT OF THE DISCLOSURE

A method for forming lengths of flexible shafting with parallel squared and tapered ends by swaging hourglass waists of square or round cross section at predetermined spacings along mill lengths of cable and burning-off adjacent lengths at the narrowest portion of the waists.

BRIEF SUMMARY OF INVENTION

This invention relates to flexible cable, and more particularly relates to the operation of forming the ends of flexible shafts.

Flexible shafts are built by winding one layer of wire upon another such that successive layers alternate in pitch direction. The wound shaft element is then cut to lengths and inserted within a flexible covering in the nature of a tube or sheath which acts as a guide and protects the shafting from dirt or injury. The general procedure is to burn off shafts of the desired length from mill length shafting, taper each end, either square or round in configuration, and form each of the portions adjacent the ends into a square configuration at desired length. The tapering permits the shaft to be conveniently threaded into and through the casing sheath. In this regard, burning off of the ends prior to tapering acts to weld the individual wire elements together into an integrated mass which deters unraveling of the wound but cut spring wire. Additional compacting occurs during the stamping or swaging operation further impedes the protrusion of wire ends which could otherwise lead to catching within the sheath during threading or in use. The integrally formed squared off end has been used in recent years to replace in part the more expensive shaft end fittings by means of which connection is made to the driving and driven elements. Use of the integral square allows the shaft to be directly coupled by quick disconnect or snap fittings having squared sockets.

The square forming and tapering of each end on an individual basis is a well known and established procedure in the industry. The present invention contemplates the formation of oppositely tapered zones of square or round cross sections at predetermined spacings along the mill length of shafting to define hourglass waists and simultaneously swaging parallel squared portions adjacent each waist. Then burn-off of the shafting is performed immediately at the waist portion of the "double-taper" or "twin-tapered" zones. Thus, at the separation point, a fully prepared section of shaft will have been cut with a parallel square and tapered portion at each end, and the next succeeding portion of the shaft will have had one end prepared in anticipation of having the next length double-squared and tapered. This can easily be seen to result in great economies in a highly competitive manufacturing situation.

It is, therefore, an object of this invention to provide a method for preforming zones of mill length flexible shafting at predetermined spacings so as to produce lengths of flexible shafts with an integral parallel square having a tapered "square" or tapered "round" at each end.

Another object of this invention is to provide a method for producing predetermined lengths of parallel square taper-ended flexible shafting at great savings in manufacturing costs.

Still another object of this invention is to provide a method for making any size length of flexible shafting with parallel square and tapered ends in production quantities.

Yet another object of this invention is to provide a method for making sections of flexible shafting in which great precision is afforded in length tolerance while at the same time yielding a part which is resistant to unraveling.

Other objects of this invention are to provide an improved article and method of the character described, which is easily and economically produced, sturdy in construction, and highly efficient and effective in operation.

BRIEF DESCRIPTION OF FIGURES

With the above and related objects in view, this invention consists of the details of construction and combination of parts as will be more fully understood from the following detailed description when read in conjunction with the accompanying drawings in which:

FIGURE 1 is a fragmentary perspective view of a flexible cable having a parallel square portion with a tapered square end made in accordance with the method of this invention.

FIGURE 1A is a fragmentary perspective view of a flexible cable having a parallel squared portion with a round tapered end.

FIGURE 2 is a perspective view of die about to swage in a double-formed squared and tapered portion of the flexible shaft.

FIGURE 3 is a sectional view of the squared and tapered double-formed portion as it is developed in the die.

FIGURE 4 is a sectional view taken along lines 4—4 of FIGURE 3.

FIGURE 5 is a sectional view similar to FIGURE 4 after the cable has been rotated on its axis through 90° with respect to the line of reciprocation of the die.

FIGURE 6 is a sectional view taken along lines 6—6 of FIGURE 3 showing a tapered square waist portion.

FIGURE 7 is a sectional view taken along lines 7—7 of FIGURE 3.

FIGURE 8 is a sectional view similar to FIGURE 6 showing a tapered round waist.

DETAILED DESCRIPTION

Referring now in greater detail to the drawings in which similar reference characters refer to similar parts, the method of the instant invention comprises the formation of lengths of flexible cable A with a parallel square portion 10 adjacent a squared tapered end 11. A swaging die B, which includes opposed complementary halves, forms waists 12 of square cross-sectional configuration at longitudinaly spaced intervals along the mill length of flexible shafting.

The cable shaft A is conventional in every detail and, as is well known, includes a plurality of layers of spring wire wound in alternate pitch directions. The instant invention is applicable to any diameter, length or number of layers.

Each of the die B has a hardened rectilinear recess 14 of square hour-glass configuration formed in its swaging surface. In the embodiment shown in FIGURES 2, 3, and 4, the cross-section of the recess 14 in each die half is V-shaped in orientation with the apex 14a of the "V" at the greatest depth and symmetrically disposed between right angled die surface walls. Thus, when the die halves are reciprocated toward each other, the apices are directed along a line coextensive with the axis of die reciprocation. In this manner, the waist 12 is formed in a square (right angle diamond) configuration with opposing corners 20–21 and diagonally with respect thereto corners 22–23.

As would be apparent, and as is shown in FIGURE 4, repeated stamping strokes of the die B at the same zone and at the same orientation of the flexible shaft A causes an exudation of material at each of the corners 22 and 23. This excess metal material would form a parting line or "flash" at the corners 22–23 which is extremely undesirable and intolerable in precision flexible shafting. As a consequence, with each stroke of the die B, the cable A is rotated in a 90° arc with respect thereto, as shown in FIGURE 5. In this manner, the "flash" previously formed is compressed by the apices 14a whereby repeated die closures, each at 90° to the previous position, causes the excess metal to work into the interstices of the wire itself and divergently along the cable from the waist 12. Accordingly, the compacting of the meal acts as an impediment to unraveling. Immediately, after the last closure of the die B in forming the waist 12, two electrodes 25 and 26 clamp the parallel square sections. An electric current is passed through the shaft between electrodes 25 and 26, and the shaft burned off by resistance heating. The electric burnoff welds the individual wire elements and severs the waist 12 at its narrowest portion. In this manner, the left hand portion of the flexible shaft A, as shown in FIGURE 3, will be detached from the length being fed into the die and will be completely and accurately formed into a precise length with parallel squared and tapered ends. By the foregoing procedure, it has been found that square taper ended lengths of flexible shafting can be formed to tolerances of ±1/16 inch in lengths from 1⅝ inch to 12 feet. Tapered round ends 11a are formed in a similar manner, as shown in FIGURE 1A.

It is also apparent that instead of rotating the shaft A in 90° arcs with each stroke of the die B, the shaft A can be maintained stationary about a polar axis and the die halves rotated at 90° increments. It is also within the contemplation of this invention to dispose two pairs of dies B at 90° with respect to each other so that the stroke of one set of dies is perpendicular to the other. It is similarly understood that the dies B may be arranged progressively along the axis of the cable feed with rotation of the cable occurring or with alternate die closures along reciprocable axes at 90° intervals.

Although this invention has been described in considerable detail, such description is intended as being illustrative rather than limiting since the invention may be variously embodied, and the scope of the invention is to be determined as claimed.

What is claimed is:
1. A method for forming lengths of wire-wound flexible shafting from mill lengths of circular cross-sectioned stock comprising the steps of swaging hour glass-shaped waists at predetermined longitudinal intervals along the mill stock lengths including forming a zone of parallel square cross-section immediately adjacent the respective margins of each of the waists, and severing successive lengths by burning off at the narrowest portion of the waists to provide precision-cut lengths of shafting with a tapered portion at each end to facilitate threading and a parallel square portion adjacent the tapered portions to facilitate coupling.

2. The method of claim 1 wherein the parallel square cross-sectioned portions adjacent the waist are formed by reciprocable dies having complementary recesses therein which are V-shaped in cross-section.

3. The method of claim 2 wherein the shafting is rotated 90° with respect to the dies with each reciprocable stroke thereof to compact in and eliminate "flash."

4. The method of claim 1 wherein the waists are formed into a pyramidal configuration.

5. The method of claim 4 wherein the pyramidal configuration is formed of square cross-section.

6. The method of claim 2 wherein the waists are formed with a round configuration.

7. The method of claim 6 wherein the waists are conical in configuration.

8. The method of claim 3 wherein the severing of the waists is performed by electric resistance burn-off.

9. The method of claim 1 wherein each of the waists is formed to include a pair of outwardly diverging portions extending from each end of a short medial segment of uniform section.

10. The method of claim 9 wherein the short medial segment is removed during burn-off.

References Cited
UNITED STATES PATENTS

| | | | |
|---|---|---|---|
| 571,869 | 11/1896 | Stow | 64—2 |
| 1,649,310 | 11/1927 | Joline | 29—414 |
| 1,649,855 | 11/1927 | Rairden | 29—414 |

FOREIGN PATENTS

| | | |
|---|---|---|
| 1,152,440 | 2/1958 | France. |

LOWELL A. LARSEN, Primary Examiner

U.S. Cl. X.R.

29—414